Jan. 18, 1938. W. NOBLE 2,105,490
LUBRICATOR
Filed July 14, 1934 2 Sheets-Sheet 2

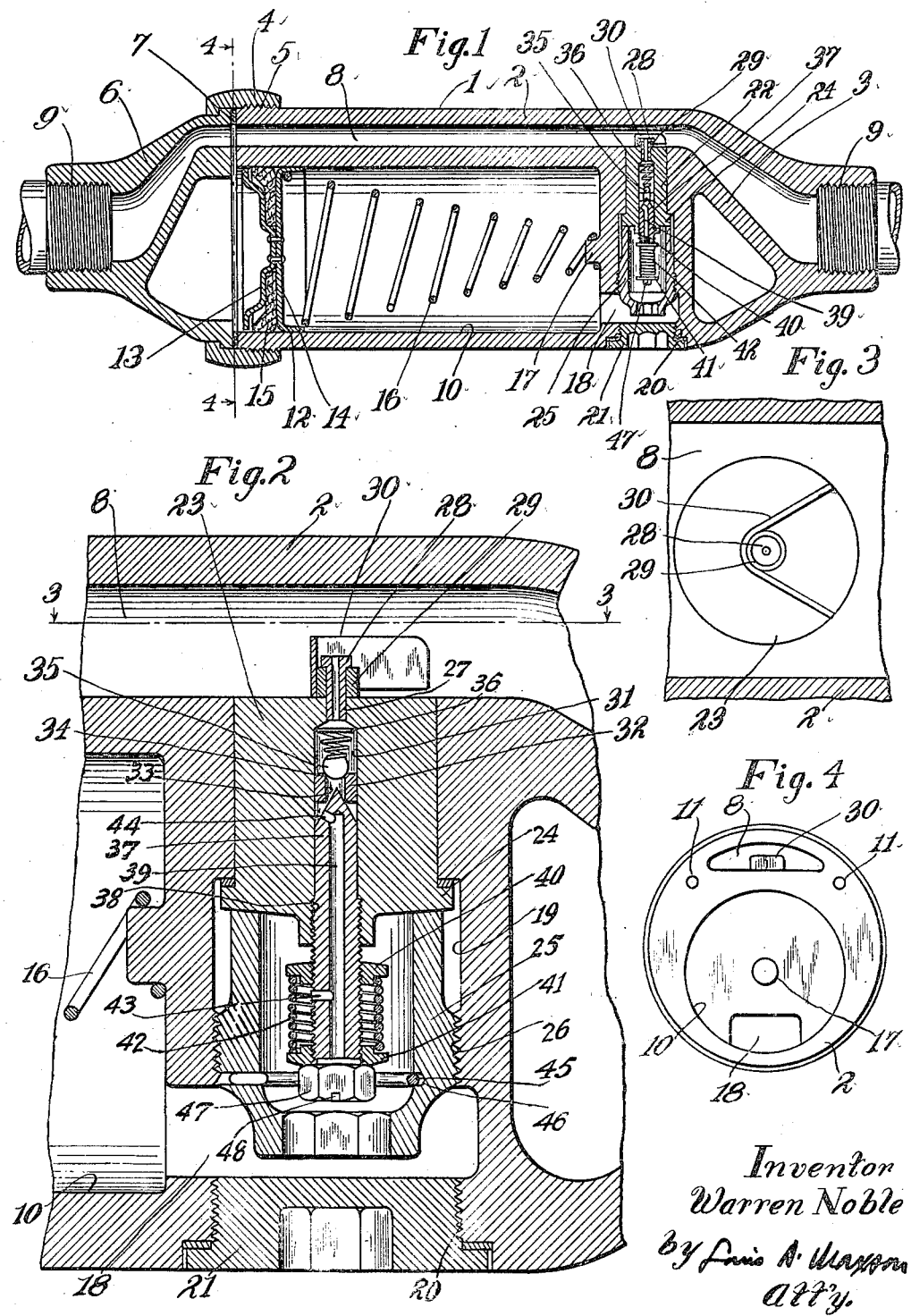

Inventor
Warren Noble
By Anis A. Maxson
Atty.

Patented Jan. 18, 1938

2,105,490

UNITED STATES PATENT OFFICE 2,105,490

LUBRICATOR

Warren Noble, Michigan City, Ind., assignor to Sullivan Machinery Company, a corporation of Massachusetts Application July 14, 1934, Serial No. 735,162

23 Claims. (Cl. 184—55)

This invention relates to lubricators, and more particularly to improvements in lubricators of the type commonly known as an "air line oiler" for feeding lubricant to a compressed air line.

In an "air line oiler" it is desirable to provide distribution of the lubricant consonant with the flow of the compressed air through the oiler irrespective of the sense of such flow, the position of the oiler in space or the degree of depletion of the lubricant therein. A common application is the "line oiler" utilized between a compressed air source and a compressed air actuated hammer tool, such as a rock drill, for the purpose of feeding lubricant to the air line leading to the tool whereby the working parts of the tool are lubricated. Many schemes for accomplishing this have been devised, but, so far as I am aware, none have completely satisfied an ideal specification. Types in use employ a pendulum control of the suction passage between the air line and the lubricant reservoir, a system that suffers serious limitations when viewed from the standpoint of true universality—a virtue which when completely achieved is of great value to the operator of equipment needing the service of a "line oiler", since all thought as to hose run, provided the oil reservoir be duly refilled, may be dismissed; and anxiety lest the feeding of lubricant stop, due to the lack of immersion of the suction line despite the pendulum action (all because of its singleness of plane of action) disappears, and assurance that the supply of oil will give continuous lubricant to the last drop takes its place.

An object of this invention is to provide an improved lubricator. Another object is to provide an improved lubricator of the "air line oiler" type for feeding lubricant into a compressed air line in such manner as to provide distribution of the lubricant consonant with the flow of pressure fluid through the lubricator irrespective of the sense of such flow, the position of the lubricator in space, or the degree of depletion of the lubricant therein. Another object is to provide an improved "air line oiler" type of lubricator having improved means for feeding the lubricant to the air line and improved control means therefor so that irrespective of the position of the lubricator in space, lubricant will be fed to the air line until the supply of lubricant is exhausted. A still further object of this invention is to provide an improved lubricator having a reservoir of variable volume so as the lubricant therein is depleted, the reservoir becomes increasingly smaller until all the lubricant has been used. Still another object is to provide an improved flow control means for such a lubricator whereby the lubricant is fed to the air stream in an improved manner and irrespective of the direction of flow of the air stream through the lubricator. These and other objects and advantages of the invention will, however, hereinafter more fully appear.

In the accompanying drawings there are shown for purposes of illustration several forms which the invention may assume in practice.

In these drawings—

Fig. 1 is a central, longitudinally extending, vertical sectional view of an "air line oiler" constructed in accordance with one illustrative embodiment of the invention.

Fig. 2 is an enlarged detail sectional view showing details of construction of the vane jet orifice arrangement.

Fig. 3 is a sectional view taken on line 3—3 of Fig. 2.

Fig. 4 is an end elevational view taken in the plane of line 4—4 of Fig. 1, with parts removed.

Figure 5:
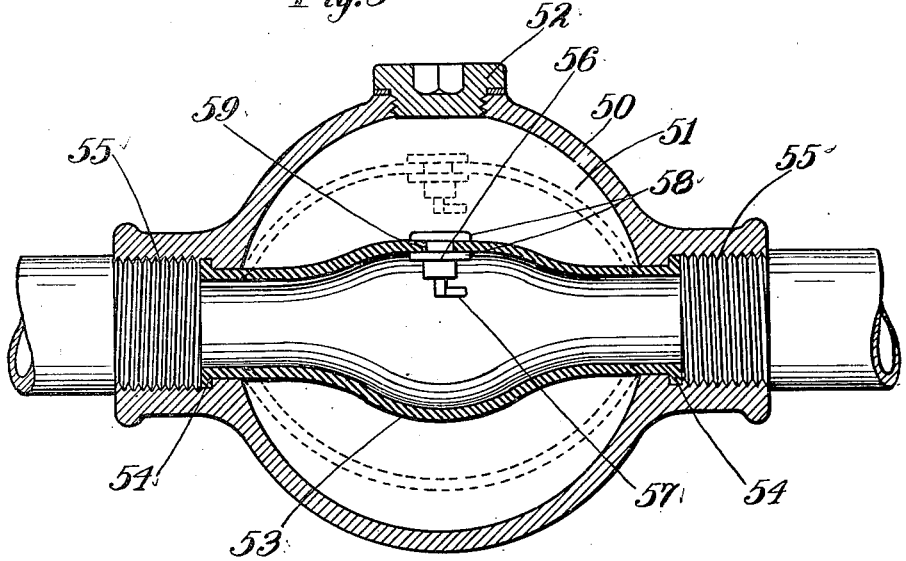
Fig. 5 is a view similar to Fig. 1 showing a modified form of construction.

Briefly, the improved lubricator consists of a pipe for the air, an oil jet with a vane in the air stream for self-adjustment to suction producing conditions and a variable volume or collapsible reservoir responding to the differential pressure set up by a vane jet orifice arrangement. Air flow being established, the oil reservoir is contracted until completely full with respect to the jet orifice and so continues until the limit of collapsibility is reached. The type of lubricant handled and the supply requirements control to a great extent the nature of the collapsible system. Thus, with either castor oil, water or glycerine it is possible to use rubber as a collapsible medium. These designs can usefully employ the seamless metallic bellows of commerce, but in general it will be found that the entire relation of the air pipe and oil reservoir can be such as to make possible the use of a simple form of lip-packed piston and cylinder. Oil capacity in this way becomes merely a matter of specification—ounces or barrels may be similarly handled.

In the illustrative embodiment of the invention shown in Figs. 1 to 4, inclusive, there is shown an "air line" lubricator generally designated 1, comprising a cylindrical body 2 having at one end an integral head 3. Secured to the opposite end of the body 2 as by a shell nut or retaining collar 4 threaded at 5 to the body, is a head 6, the head 6 and the adjacent end of the body both of a face contour as shown in Fig. 4 and having interposed therebetween suitable packing, in the form of a circular gasket 7, to prevent pressure leakage. Said body and heads comprise, in assembling, an air passage 8 of constant area running between the pipe or hose sockets 9, 9 formed within the heads 3 and 6. In the body 2 is a smooth cylinder shown at 10 in Figs. 1 and 4. The absence of gaskets between the remainder of the matching faces maintained in vis-a-vis alinement by dowels 11, 11 provides air passageway from the air passage 8 to the cylinder space 10. Reciprocable in the cylinder 10 is a piston 12, and this piston is composed of two stampings 13 and 14 with a cup packing of rubber or a rubber annulus 15 held between them. The stamping 13 is formed to act both as a stop and lip protection for the packing ring 15. Interposed between the inner wall of the cylinder 10 and the piston 12 is a conical spring 16 whose major coil substantially fills the shell diameter of the piston stamping 14. This spring is centered on a boss 17, and is of sufficient strength to just overcome the friction of the piston within the cylinder. The conical form of the spring 16 permits it to pack in the minimum of space without interference between coils. A port 18 having one wall substantially coincident with the cylinder wall leads to a transverse bore 19 running between the port 18 and a filling plug orifice 20 closed by a plug 21 gasketed to air tightness. The port to the air passage portion is filled by the jet assembly generally indicated in Fig. 1 at 22 and in Fig. 2 in enlarged section and complete detail. The position and arrangement of the cylinder 10, head port 18 and filling plug 21 are so determined as to avoid air pockets when filling with oil. It will be observed that the entire cylinder and port space can be readily filled with oil with natural expulsion of air. This is not an essential, but a sensible precaution tending to uniformity of performance and the best use of the available reservoir space. Turning now to Fig. 2, the jet body or bushing is indicated at 23 and is collared and gasketed at 24 and held by the screw quill 25 threaded at 26 within the walls of the bore 19. Secured within a restricted bore 27 formed in the jet body is a jet sleeve 28, this sleeve being pressed within the jet body and having pivotally mounted thereon a collar 29 to which is secured a vane 30 herein formed of a U-shaped piece of sheet metal mounted on the collar or bushing 29 to which it is soldered, the sheet metal projecting beyond the upper face of the bushing to a dimension determined by the intensity of the suction to be set up. The jet body 23 is of sufficient diameter to permit the vane 30 to swing within its projected area, and the bushing 29 is free to turn on the jet sleeve 28 so that the vane assembly can swing with the air stream flowing through the passage 8, thus providing self-adjustment to air direction.

Immediately below the jet sleeve 28 is a bore 31 formed in the jet bushing 23, and pressed within this bore is a bushing 32 having an axial opening 33 and providing on one face a valve seat at 34. Arranged in the bore 31 is a ball valve 35 loaded by a very light spring 36. The other face of this bushing forms, in conjunction with a needle valve 37, a quantity control valve. The needle valve 37 is threaded at 38 within the jet bushing 23 and is piloted within the bore 31 and is drilled to provide an axial passage 39. Threaded externally on the needle valve body are spaced washers 40 and 41, and arranged between and positioned by these washers is a coil spring 42 having its coils relatively close together to provide an oil filter. The axial passage 39 communicates with the space within the coil spring 42 between the washers through a lateral port 43, and at its upper end communicates through a diagonal port 44 with the bore 31 below the bushing 32. Oil is drawn between the coils, leaving the dirt on the outside where it can be readily cleaned away, enters the radial port 43 within the filter and passes up the center of the needle valve through the axial passage 39, and exits by the diagonal port 44 in the needle point to meter at the valve seat formed against the bushing 32, and thence past the ball valve and through the jet sleeve into the air stream in passageway 8. The needle valve 37, complete with its filter, is easily adjusted when the filler cap 21 is open, though locked against involuntary movement by a tailed triangular spring 45 held in an annular recess 46 in the quill 25 and bearing on the flats of the hexagon head 47 of the needle valve. This head 47 is transversely slotted at 48 for screw driving.

Let us suppose that the whole system is dead, and follow the sequences of events subsequent to air flow being established in air passageway 8. Presume that the oil reservoir is half empty, the spring 16 can push the piston 12 back to its stop, and there is no air pressure in the pipe line. The pressure comes on: the pipe line fills up though there is as yet no flow. The interstice between the head 6 and body 2 admits this pressure to the head side of the oil cylinder piston. Also, since the jet sleeve is open to the pipe line, this same static pressure is communicated to the region above the ball valve 35. Now the piston assembly will move in, in the cylinder, until whatever air there may be trapped within the cylinder assumes substantially the same pressure as in the line. The oil may be partially immersing or remote from the jet region, i. e., the air content may be entirely within the port zone 18 or entirely at the piston or in any imaginable intermediate condition, depending upon the position of the lubricator in space. It is certain, however, that the system is in pressure balance. Let flow be established by opening a valve remote from the pressure source. Instantly the vane 30 whips its tails down stream, suction is created above the jet sleeve 28, ball valve 35 lifts off its seat and the pressure within the jet passages, the port space and cylinder, is immediately reduced.

If the air content of the cylinder is adjacent to the jet, it is swiftly swept out and the piston assembly follows up and solid oil is soon reached, to be ejected in spray form into passageway 8 in the wake of the valve. If solid oil exists about the exit, the piston moves up only as fast as the oil that is used permits it, and the air content persists in the cylinder at line pressure less suction pressure induced. If the reservoir is perfectly filled in the first place, the motion of the piston will be very slow, the piston moving inwardly within its cylinder only as fast as oil is used in the reservoir. If the reservoir or cylinder should contain a very small quantity of liquid, the piston 12 would run in to the approximate end of its stroke almost as soon as the pressure was established in the system. The purpose of the ball valve 35 is to prevent the piston from running back to its stop under the influence of the spring 16 each time the air is turned off at the tool or whenever the flow of fluid through the passageway 8 is interrupted. The running back of the piston, however, would make very little difference in the actual functioning of the device, except that the cup leather 15 would have more wear and there would be a greater, though unimportant, delay in establishing oil spray into the line under some conditions. With the valve 35 incorporated, the piston in the oil cylinder follows up continuously, and the reservoir acts as an ever filled container, though decreasing in volume as the oil is used. The follow up of the piston continues until the filler cap 21 is opened to let in air, and the spring 16 then moves the piston back to its stop and permits filling of the reservoir to maximum capacity. The pressure conditions establishing the spray of oil are analogous to those responsible for the spray of gasoline from the jet of a carburetor. While the "atmospheric" line in this case may be 100 pounds per square inch instead of 15 pounds per square inch, making for somewhat higher differential, the actual pressure values are only about 2 pounds.

No necessity for any specific size relationships between the elements exists, and the interrelation of the functions is dictated purely by convenience at times. It might be useful to disassociate the oil chamber from the hose pipe jet system and hose separately to it in order to use a very large oil reservoir on a permanent line.

The modified form of the invention shown in Fig. 5 embodies all the principles of the form of the invention above described, though in this instance unsuitable for use with ordinary lubricating oil. However, castor oil, water and glycerine are all used as lubricants, and are neutral to rubber so that in this instance the volume of the reservoir is varied by means of an expansible rubber tube or bag. The lubricator casing in this instance is preferably generally spherical in form, as indicated at 50, to provide a lubricant reservoir 51 and has threaded therein a filler plug 52 to enable filling of the reservoir. Extending centrally through the reservoir is an expansible tube or bag 53 having its collared ends 54 shaped to form gaskets for the hose joints, the hose connections being indicated at 55, 55. Carried by the expansible tube directly opposite to the filler plug opening is the jet assembly generally designated 56 with vane 57 and similar in construction to the jet assembly and vane shown in Fig. 2. The jet assembly is secured to the rubber tube by means of flanged collars 58 clamped to the tube, and the tube is provided with an opening 59 through which the jet assembly extends when so held in clamped position. As the compressed air flows through the pipe line and through the expansible tube or bag 53, the latter expands, placing the lubricant within the reservoir 51 under pressure, and the discharge of lubricant from the reservoir is controlled by the jet arrangement 56 in exactly the same manner as in the form of the invention above described.

Figure 6:
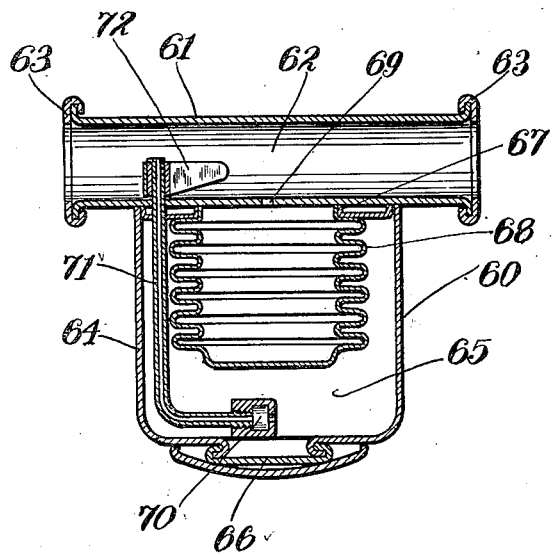
Fig. 6 shows still another modified form of construction.

In the modified embodiment of the invention shown in Fig. 6, there is shown a lubricator casing 60 comprising a tubular section 61 through which extends the air passageway 62, and this pipe section has a flange collar 63 for connection to the air pipe line. Secured to the tubular section 61 is a casing 64 having formed therein a lubricant reservoir 65. This reservoir has a suitable detachable filler plug 66. Secured at 67 to the casing and projecting within the reservoir is an expansible bellows 68, and the interior of this bellows is communicable with the air passage 62 through a passage 69. Communicating with the reservoir at the lower portion thereof is a jet 70 connected by a tube 71 with the air passageway 62, and swiveled on the upper end of this tube is a vane 72 similar to the vane 30 as shown in Fig. 2. This jet and vane arrangement operates in the same manner as that shown in Fig. 2. When compressed air is supplied through the passageway 62 it flows through passage 69 to the interior of the bellows, causing the latter to expand and thereby place the lubricant in the reservoir 65 under pressure. Flow of lubricant from the reservoir is controlled by the jet 70. Otherwise this form of the invention is the same as that in the forms above described.

As a result of this invention, it will be noted that an improved air line lubricator is provided which is capable of operation in any position in space and irrespective of the quantity of lubricant therein, the lubricator constituting which might be termed an "astatic" lubricator since it may function in any position. It will further be noted that the improved lubricator is comparatively simple in design, requiring a comparatively small number of parts which may be manufactured at a minimum of expense. These and other uses and advantages of the improved air line oiler will be clearly apparent to those skilled in the art.

While there are in this application specifically described several forms which the invention may assume in practice, it will be understood that these forms of the same are shown for purposes of illustration and that the invention may be further modified and embodied in various other forms without departing from its spirit or the scope of the appended claims.

What I claim as new and desire to secure by Letters Patent is:

1. In a pressure fluid line lubricating device, a casing having a passage extending longitudinally therethrough through which the fluid in the pressure line may flow selectively in opposite directions and end connections adapted for attachment to a pressure fluid line, said fluid passage extending longitudinally between and connecting said end connections to provide fluid flow therebetween, an oil reservoir of variable volume in said casing in adjacency to said fluid passage and having a movable wall dividing the same into an oil chamber and a pressure chamber, means providing communication between said oil reservoir and said fluid passage and between said fluid passage and said pressure chamber, means for setting up a differential pressure between said fluid passage and said oil reservoir for effecting the discharge of oil from said oil chamber to said fluid passage irrespective of the direction of fluid flow through said passage, and means for adjustably controlling the flow of oil between said reservoir and said fluid passage and embodying means for automatically preventing reverse flow therebetween.

2. In an air line lubricator, a casing having a streamway extending longitudinally therethrough through which the fluid in the air line may flow selectively in opposite directions and end connections adapted for attachment to an air line, said streamway extending longitudinally between and connecting said connections to provide air flow therebetween, a collapsible reservoir in said casing in adjacency to said streamway and including a collapsible element for varying the volume of the reservoir, means providing communication between the streamway and the streamway side of the collapsible element, and means operative in either direction of flow in said streamway for setting up reduced pressure on the reservoir side of said collapsible element to set up discharge from the reservoir to the streamway.

3. In a lubricator, a streamway through which fluid may flow selectively in opposite directions, a jet passage communicating with a lubricant reservoir and discharging into said streamway, and means for effecting flow of lubricant from the reservoir to the streamway through said jet passage including movable means actuated by the fluid flowing in the streamway and automatically adjustable into its most effective position in the streamway in accordance with the direction of fluid flow in the streamway.

4. In a lubricator, a streamway through which fluid may flow selectively in opposite directions, a jet discharging into said streamway and through which the lubricant flows to the streamway, and a vane swiveled to turn freely about the axis of said jet within the streamway and turnable about its swivel to assume its most effective position automatically in accordance with the direction of fluid flow in the streamway.

5. A reversible line oiler comprising a casing having end connections connectible at either end to a conduit to which lubricant is to be supplied and having a passage extending longitudinally through the casing through which pressure fluid may flow to said conduit selectively in opposite directions, said passage extending longitudinally between and connecting said end connections to provide flow therebetween, an oil reservoir of variable volume in said casing in adjacency to said passage, and means for maintaining the oil in said reservoir under pressure irrespective of the volume of said reservoir and the direction of flow to said passage, said last mentioned means including a passageway for connecting said reservoir with said passage.

6. In conjunction with a fluid streamway, a differential pressure producing means embodying an orifice in communication with a reservoir to be evacuated to provide a differential pressure between the inside and outside of said reservoir, said orifice communicating with said streamway, and a swingable vane surrounding said orifice for producing, as the fluid flows through said streamway, a suction at the mouth of said orifice, said vane being free to turn about the axis of said orifice to assume the most effective position for its purpose.

7. A suction inducing and spray distributing device for inclusion in a streamway to which liquid is to be added comprising means providing an axial orifice, and a bifurcated vane embracing the orifice and having projecting tails, the upper edge of the vane being above the orifice, the tails extending away from the orifice in the direction of fluid flow in the streamway and the distance between the tails being greater than twice the radius of the arc of the vane embracing the orifice.

8. An air line oiler comprising a casing having an air passageway extending longitudinally therethrough through which air under pressure may flow selectively in opposite directions and end connections adapted for attachment to an air line, said air passageway extending longitudinally between and connecting said end connections to provide air flow therebetween, a cylinder in said casing in adjacency to said air passageway, a piston reciprocable in said cylinder, said cylinder and piston forming a variable volume lubricant reservoir, means providing passage means for supplying air under pressure from said passageway to act on the outer pressure area of said cylinder piston to maintain the lubricant in said cylinder reservoir under pressure, and means controlled by the pressure fluctuations in said air passageway and operative to produce a reduced pressure on the inner pressure area of said piston in advance of the latter irrespective of the direction of flow in said air passageway for conducting lubricant from said cylinder reservoir to said air passageway.

9. In a lubricating device for supplying lubricant to the supply line for a pressure fluid operated tool, a casing providing a chamber containing lubricant, an elastic element dividing the space within said chamber into two portions and arranged to provide a passage for the flow of motive fluid to be lubricated and deformable, on motive fluid flow, towards conformity with the inner wall of said chamber, and a lubricant discharge jet device movable with said elastic element.

10. In a lubricator, a casing having a lubricant reservoir, an expansible conduit extending through said casing and expansible under the action of pressure fluid flowing therethrough for maintaining the lubricant in said reservoir under pressure, and means for regulating the flow of lubricant from said reservoir to the fluid stream flowing through said conduit.

11. In a pressure fluid line lubricator, a casing providing a lubricant reservoir and having extending therethrough a passage through which fluid under pressure may flow, and means for controlling the flow of lubricant from said reservoir to said fluid passage irrespective of the direction of flow of pressure fluid through said passage and including a flow determining means in said passage which flow determining means is movable automatically into its most effective flow determining position by the fluid flowing through said passage.

12. In a pressure fluid line lubricator, a casing providing a lubricant reservoir, and a passage through which fluid under pressure may flow, means actuated by pressure fluid for maintaining the lubricant in said reservoir constantly under pressure, and means for regulating the flow of lubricant from said reservoir to said pressure fluid passage irrespective of the direction of flow of pressure fluid through said passage and including a flow determining means arranged in said passage and movable automatically into its most effective flow determining position by the fluid flowing through said passage.

13. In a lubricator, a casing attachable in a pressure fluid line and having a passage extending longitudinally therethrough through which pressure fluid may flow selectively in opposite directions and end connections adapted for attachment to a pressure fluid line, said pressure fluid passage extending longitudinally between and connecting said end connections to provide fluid flow therebetween, and a lubricant reservoir variable in volume in said casing in adjacency to said fluid passage, means actuated by the pressure of the fluid in said passage for maintaining the lubricant in said reservoir under pressure irrespective of the variation in volume thereof and including a passageway for connecting said reservoir to said passage, and means for effecting flow of lubricant from said reservoir to said fluid passage irrespective of the direction of flow of the pressure fluid through said passage.

14. In a lubricator, a casing having a passage extending therethrough through which pressure fluid may flow selectively in opposite directions and a lubricant reservoir variable in volume, means actuated by the pressure of the fluid in said passage for maintaining the lubricant in said reservoir under pressure irrespective of the variation in volume thereof, and means for effecting flow of lubricant from said reservoir to said passage irrespective of the direction of flow of the pressure fluid through said passage, said flow effecting means including a flow determining element movably mounted in said pressure fluid passage and movable into its most effective flow determining position automatically in accordance with the direction of fluid flow through said passage.

15. In a lubricator, a casing attachable in a pressure fluid line and having a conduit extending longitudinally therethrough through which pressure fluid may flow selectively in opposite directions and end connections adapted for attachment to a pressure fluid line, said conduit extending longitudinally between and connecting said end connections to provide fluid flow therebetween, and a lubricant reservoir variable in volume in said casing in adjacency to said conduit comprising a chamber and a piston reciprocable in said chamber, means for supplying pressure fluid from said conduit to said chamber irrespective of the direction of flow of pressure fluid through said conduit to act on the outer side of said piston to apply pressure to the lubricant in said reservoir irrespective of the volume of said reservoir, and a jet device for discharging lubricant from said reservoir to said conduit irrespective of the direction of flow of pressure fluid through said conduit.

16. In a lubricator, a casing attachable in a pressure fluid line and having a conduit extending longitudinally therethrough through which pressure fluid may flow selectively in opposite directions and end connections adapted for attachment to a pressure fluid line, said conduit extending longitudinally between and connecting said end connections to provide fluid flow therebetween, a lubricant reservoir variable in volume in said casing in adjacency to said conduit, means having communication with said conduit and actuated by the pressure of the fluid in said conduit irrespective of the direction of fluid flow through said conduit for maintaining the lubricant in said reservoir under pressure, and means operative irrespective of the direction of fluid flow through said conduit for conducting lubricant from said reservoir to said conduit.

17. In a lubricator, a casing attachable in a pressure fluid line and having a conduit extending longitudinally therethrough through which pressure fluid may flow selectively in opposite directions and end connections adapted for attachment to a pressure fluid line, said conduit extending longitudinally between and connecting said end connections to provide fluid flow therebetween, a lubricant reservoir variable in volume in said casing in adjacency to said conduit, means having communication with said conduit and actuated by the pressure of the fluid in said conduit irrespective of the direction of fluid flow through said conduit for maintaining the lubricant in said reservoir under pressure and including a pressure applying means acting on the lubricant in said reservoir and movable with respect to the casing as the volume in said reservoir varies, and means operative irrespective of the direction of fluid flow through said conduit for conducting lubricant from said reservoir to said conduit.

18. In a lubricator, a casing having a conduit through which pressure fluid may flow selectively in opposite directions and a lubricant reservoir variable in volume, means actuated by the pressure of the fluid in said conduit irrespective the direction of fluid flow through said conduit for maintaining the lubricant in said reservoir under pressure and including a pressure applying means acting on the lubricant in said reservoir and movable with respect to the casing as the volume of the reservoir varies, means operative irrespective of the direction of fluid flow through said conduit for conducting lubricant from said reservoir to said conduit, and means for moving said pressure applying means into its position of maximum reservoir volume when the supply of pressure fluid to said conduit is discontinued.

19. In an air line lubricator, a casing having a passageway through which fluid may flow selectively in opposite directions, a lubricant reservoir in said casing, a jet discharging into said passageway and through which lubricant is discharged from said reservoir to said passageway, and a vane within said passageway and mounted freely to turn about the axis of said jet and turnable into its most effective position with respect to said jet automatically in accordance with the direction of fluid flow in said passageway for effecting lubricant flow from the jet to the passageway.

20. In a lubricator, a casing having a fluid passageway into which lubricant is discharged, a lubricant reservoir in said casing, and a suction inducing and spray distributing device for inclusion in said passageway comprising means providing an axial lubricant discharge orifice communicating with said passageway, and a bifurcated vane embracing said orifice and having projecting furcations, the upper edge of the vane being above said orifice, the furcations of the vane extending away from the orifice in the direction of fluid flow through said passageway, and the distance between the furcations being greater than twice the radius of the arc of the vane embracing said orifice.

21. In a lubricator, a casing having a passageway through which fluid may flow selectively in opposite directions, a lubricant reservoir in said casing, and a differential pressure producing means for creating a differential pressure between the inside and outside of said reservoir and embodying a lubricant discharge orifice communicating with said passageway, and a vane surrounding said orifice in said passageway for creating a suction in the orifice as fluid flows past said vane, said vane automatically adjustable to the direction of flow of fluid in said passageway and free to turn about the axis of said orifice to assume the most effective suction-creating position in said passageway.

22. In a lubricator for pressure fluid lines, a casing having a passage extending longitudinally therethrough through which pressure fluid may flow selectively in opposite directions and end connections adapted for attachment to a pressure fluid line, said fluid passage extending longitudinally between and connecting said end connections to provide fluid flow therebetween, and a lubricant reservoir of variable volume in said casing in adjacency to said passage and having a movable wall dividing the same into a lubricant chamber and a pressure chamber, means providing communication between the reservoir and said fluid passage and between said pressure chamber and said fluid passage, means for setting up a differential pressure between the lubricant chamber and said fluid passage for effecting discharge of lubricant from said lubricant chamber to said fluid passage irrespective of the direction of fluid flow through the fluid passage, and means for adjustably controlling the flow of lubricant from said reservoir to said fluid passage.

23. In a lubricator, a casing having a passage extending longitudinally therethrough through which pressure fluid may flow selectively in opposite directions and end connections adapted for attachment to a pressure fluid line, said fluid passage extending longitudinally between and connecting said end connections to provide fluid flow therebetween, a lubricant reservoir variable in volume in said casing in adjacency to said fluid passage and embodying means actuated by the pressure of the fluid in said passage for maintaining the lubricant in said reservoir under pressure irrespective of the variation in volume thereof and the direction of fluid flow through said passage, passage means for connecting said reservoir with said fluid passage, and adjustable means for controlling the flow of lubricant from said reservoir through said passage means into said fluid passage.

WARREN NOBLE.